US00RE41070E

(19) United States
(12) Reissued Patent
Agin

(10) Patent Number: US RE41,070 E
(45) Date of Reissued Patent: Jan. 5, 2010

(54) METHOD FOR SETTING A TRANSMISSION QUALITY TARGET VALUE FOR POWER CONTROL IN A MOBILE RADIOCOMMUNICATION SYSTEM

(75) Inventor: Pascal Agin, Sucy en Brie (FR)

(73) Assignee: Alcatel, Paris (FR)

(21) Appl. No.: 11/128,404

(22) Filed: May 13, 2005

Related U.S. Patent Documents

Reissue of:
(64) Patent No.: 6,564,067
Issued: May 13, 2003
Appl. No.: 09/599,519
Filed: Jun. 23, 2000

(30) Foreign Application Priority Data

Feb. 8, 2000 (EP) ..... 00400357

(51) Int. Cl.
*H04B 7/00* (2006.01)

(52) U.S. Cl. ..... 455/522; 455/69; 455/67.11; 455/343.1; 455/525; 370/318; 370/320; 370/332; 370/465; 370/468; 370/477; 375/224

(58) Field of Classification Search ..... 455/522, 455/69, 67.11, 343.1, 525, 442, 436; 370/318, 370/320, 311, 331, 332, 465, 468, 477; 375/224–227
See application file for complete search history.

(56) References Cited

U.S. PATENT DOCUMENTS 3,925,782 A * 12/1975 Anderl et al. ..... 455/507
5,357,513 A * 10/1994 Kay et al. ..... 370/332
5,513,183 A * 4/1996 Kay et al. ..... 370/337
5,604,730 A * 2/1997 Tiedemann, Jr. ..... 370/252
5,648,955 A * 7/1997 Jensen et al. ..... 370/252
5,713,074 A * 1/1998 Hulbert ..... 455/69
5,751,763 A * 5/1998 Bruckert ..... 375/141
5,852,782 A * 12/1998 Komatsu ..... 455/522
5,896,368 A * 4/1999 Dahlman et al. ..... 370/335
5,915,216 A * 6/1999 Lysejko ..... 455/422.1
6,070,074 A * 5/2000 Perahia et al. ..... 455/430
6,085,107 A * 7/2000 Persson et al. ..... 455/522
6,137,840 A * 10/2000 Tiedemann, Jr. et al. .... 375/297
6,154,652 A * 11/2000 Park et al. ..... 455/437
6,173,162 B1 * 1/2001 Dahlman et al. ..... 455/69
6,289,009 B1 * 9/2001 Sato ..... 370/342
6,337,989 B1 * 1/2002 Agin ..... 455/522

(Continued)

FOREIGN PATENT DOCUMENTS

EP 0 949 830 A2 * 10/1999
WO WO 98/36508 * 8/1998
WO WO 99/49609 * 9/1999

*Primary Examiner*—Sharad Rampuria
(74) *Attorney, Agent, or Firm*—Sughrue Mion, PLLC

(57) ABSTRACT

A method for setting a transmission quality target value for power control in a mobile radiocommunication system, a method wherein:

an offset is applied in an anticipated way to said transmission quality target value to compensate for the effects of a compressed mode whereby transmission is interrupted during transmission gaps in compressed frames, and the transmission rate is correspondingly increased to compensate for said transmission gaps, said offset includes a first component intended to compensate for the effects of said transmission rate increase, and a second component intended to compensate for the effects of said transmission gaps, said transmission rate increase applies not only for a compressed frame but for a plurality of frames including said compressed frame, and said second component is not applied for all frames of said plurality of frames, but only for said compressed frame and/or for at least one frame, or recovery frame, following said compressed frame.

58 Claims, 3 Drawing Sheets

U.S. PATENT DOCUMENTS 6,411,817 B1 * 6/2002 Cheng et al. ..... 455/522
6,445,686 B1 * 9/2002 Hoffbeck et al. ..... 455/522
6,445,917 B1 * 9/2002 Bark et al. ..... 455/423
6,490,263 B2 * 12/2002 Kitade et al. ..... 370/337
6,496,706 B1 * 12/2002 Jou et al. ..... 455/522
6,501,958 B1 * 12/2002 Hwang et al. ..... 455/522
6,564,067 B1 * 5/2003 Agin ..... 455/522
6,738,640 B1 * 5/2004 Baker et al. ..... 455/522
6,823,193 B1 * 11/2004 Persson et al. ..... 455/522
6,829,489 B2 * 12/2004 Yamamoto et al. ..... 455/522
6,975,615 B1 * 12/2005 Toskala et al. ..... 370/342

* cited by examiner

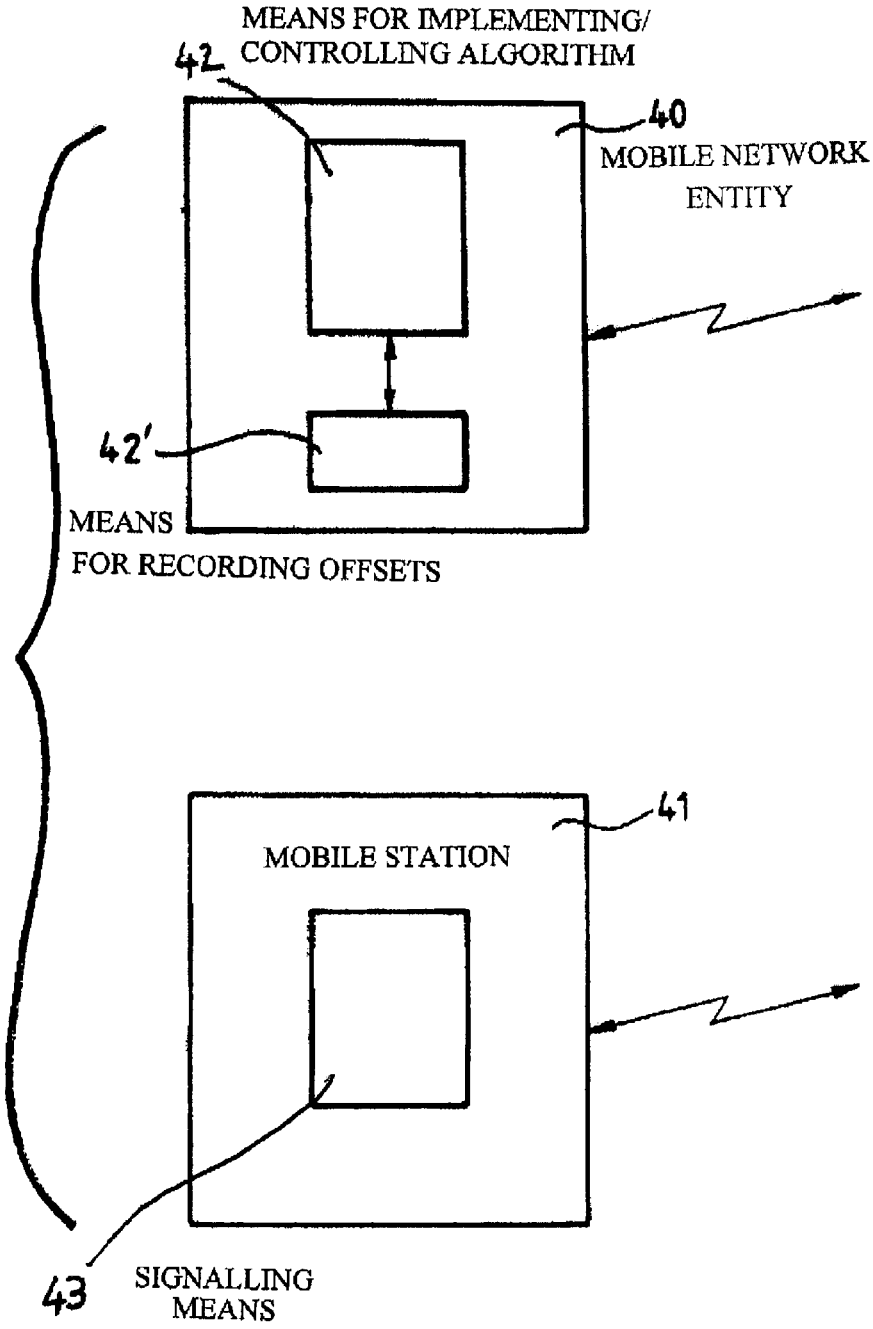
Fig. 2
(Amended)

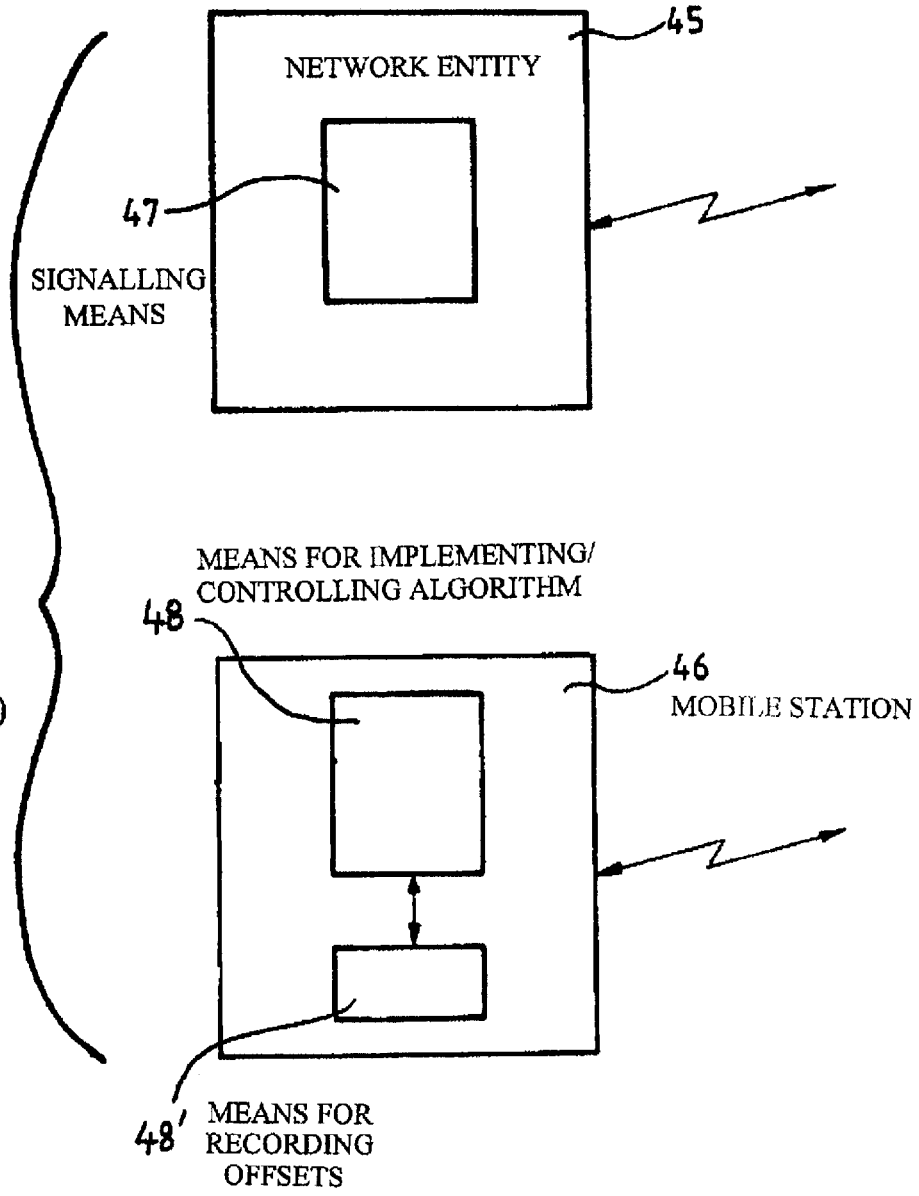
Fig. 3
(Amended)

METHOD FOR SETTING A TRANSMISSION QUALITY TARGET VALUE FOR POWER CONTROL IN A MOBILE RADIOCOMMUNICATION SYSTEM

Matter enclosed in heavy brackets [ ] appears in the original patent but forms no part of this reissue specification; matter printed in italics indicates the additions made by reissue.

BACKGROUND OF THE INVENTION

The present invention is generally concerned with mobile radiocommunication systems.

The present invention is more particularly concerned with power control techniques used in such systems to improve performances (in terms of quality of service, of capacity, . . . etc.).

The present invention is in particular applicable to mobile radiocommunication systems of CDMA (Code Division Multiple Access) type. In particular, the present invention is applicable to UMTS (Universal Mobile Telecommunication System).

The CDMA is a multiple access technique which makes it possible for several users to be simultaneously active, using different spreading codes.

All that follows is valid for both downlink (link from BTS (Base Transceiver Station) to MS (Mobile Station)) and uplink (link from MS to BTS), but in order to simplify the description, only the downlink case will first be considered.

The quality of the link from a BTS to a MS depends on the ratio of the received signal power and the interference power at the MS (SIR: signal-to-interference ratio). When the SIR of one MS is low, or equivalency when the interference power is much larger than its power, its performance dramatically decreases. Therefore, in order to optimize the performance of a CDMA system, some algorithms are usually used in order to keep the SIR of each MS as close as possible to the target SIR at the receiver, like the inner loop power control algorithm.

The principle of the inner loop power control algorithm is that the MS periodically estimates the SIR of the received signal from the BTS, and compares this SIR to the target SIR ($SIR_{target}$). If this estimated SIR is lower than the target SIR, the MS sends a command to the BTS for the BTS to increase its transmit power. Otherwise, the MS sends a command to the BTS for the BTS to decrease its transmit power. The target SIR is chosen by the MS (or BTS) in function of the required quality of service.

Additionally, another and usually slower power control algorithm, namely outer loop power control algorithm, enables to choose the best value of the target SIR. The principle of this algorithm is to regularly evaluate the quality of the transmission (BER, BLER, . . . ) and to compare this quality with the required quality of service (for example BER of $10^{-3}$ for speech service, BLER of 0.1 for packet service, . . . ). If this quality is below the required quality of service, the target SIR is increased. Otherwise, the target SIR is decreased. This algorithm is usually slow, since the quality needs to be averaged over several frames in order to have a reliable estimate. Of course many variants of this basic algorithm exist.

In some situations, the target SIR may change significantly during the transmission. For example, this is the case when the spreading factor of the physical data channel changes. Indeed, the lowest the spreading factor of this channel, the largest the required transmit power. The spreading factor can change frequently in variable rate services such as packet service. Indeed, if the spreading factor changes, the target SIR will vary much (in the ratio of the spreading factor variation). It is also the case if the MS requires to change of service, since each service has a different target SIR.

Another example is the compressed mode. In an inter-frequency hard handover, the mobile needs to make measurements on a frequency different from the frequency used for the downlink transmission. Thus, the base station needs to stop its transmission towards the concerned mobile, in order to allow this mobile to make measurements on this other frequency. In the UMTS standard, this is known as downlink compressed mode (i.e. the downlink transmission is temporarily stopped). Uplink compressed mode is also possible to make measurements on frequencies that are close to the uplink frequency. The periods where transmission is stopped are usually called transmission gaps, and the frames including transmission gaps are usually called compressed frames. Besides, to compensate for the transmission gaps, the transmission rate has to be correspondingly increased. Therefore, during compressed mode, since the inner loop power control is regularly stopped, and since the transmission rate is correspondingly increased, the target SIR needs to be larger to reach the same quality of service than during non-compressed, or normal, mode.

Because the outer-loop power control algorithm is usually a slow process, the target SIR will not change immediately and the transmission quality will be degraded during several frames. In extreme cases, this could cause the lost of the call.

Moreover, in the case of compressed mode, the target SIR needs to be changed only at certain fixed time to enable the mobile to perform measurements and then the target SIR needs to be changed back to the previous value. The outer-loop power control algorithm will not be able to track such quick variations of SIR.

In European patent application n° 99401766.3 filed on Jul. 13, 1999 by Applicant, a solution has been proposed to solve this problem. Briefly, the basic idea in this prior patent application is to anticipate the target SIR variation, i.e. to apply an expected variation, or offset, in an anticipated way, to the target SIR. This target SIR variation may be signaled from the transmitter to the receiver for a given transmission direction; for example, for downlink transmission, it may be signalled by the network to the MS or UE (User Equipment).

According to another idea in this prior patent application, in order to keep the signaling as low as possible, the target SIR increase due to the increased instantaneous bit rate and the target SIR increase due to degraded performances in compressed frames (i.e. due to transmission gaps) may be separated. For example, when the transmission rate increase in compressed mode is obtained by spreading factor reduction, this may be written:

$$\Delta_{SIR}=10\log(R_{CF}/R)+\delta S_{IR}$$

where R is the instantaneous net bit rate before and after the compressed frame and $R_{CF}$ is the instantaneous net bit rate during the compressed frame (it being understood that the term "instantaneous bit rate" means that for a compressed frame, the time period used to calculate this rate is not the whole frame period but only the fraction of this frame period where data are transmitted); for example, $10\log(R_{cF}/R)$ is equal to 3 dB for UMTS, where the matching rate is the same for compressed and non compressed frames, when compressed mode by reducing the spreading factor by a factor of 2 is used.

Since the bit rate variation will be known by the UE, only the additional target SIR increase $\delta_{SIR}$ due to degraded performances during compressed frames may be signaled. The signaling overhead can be low if this variation is signaled with other compressed mode parameters (including transmission gap length (or period where transmission is stopped, periodicity, . . . ). For example, 2 bits could enable to signal the following values of $\delta_{SIR}$:

–00: 0 dB

–01: 0.5 dB

–10: 1 dB

–11: 2 dB

Alternatively, $\Delta_{SIR}$ could be directly signaled, but a larger number of bits would be required.

The UE will have to increase the target SIR by $\Delta_{SIR}$ just before the compressed frames (or just after the transmission gap of the compressed frames) and decrease it back by the same value just after the compressed frames. This target SIR variation is done additionally to the usual downlink outer-loop algorithm that will have to take it into account. The Node B may increase simultaneously its transmit power by the same amount before the compressed frame and decrease it just after the compressed frames in order for the downlink received SIR to be as quickly as possible close to this new target SIR.

According to another idea in this prior patent application, at least when the transmission gap is at the end of the compressed frame, the performances in recovery frames (frames following the compressed frames) can also be degraded because of the power control interruption during the transmission gap. Therefore, it would be also desirable to increase the target SIR in recovery frames and to signal this target SIR increase to the UE. Alternatively, the same value ($\delta_{SIR}$) as for compressed frames could be used in order to decrease the required signaling.

Therefore, according to this prior patent application, by anticipating the target SIR variation during compressed frames and recovery frames, an efficient outer loop power control in compressed mode can be achieved, at least when said compressed mode is obtained by reducing the spreading factor.

Now, in the UMTS standard for example, two ways exist to perform compressed mode:

reducing the spreading factor in the compressed frame, enabling to increase the instantaneous bit rate and thus to stop the transmission during a few slots, using puncturing (i.e. several bits obtained after channel coding are not transmitted, so that the same amount of information bits can be sent over a shorter period, knowing that the channel coding will still enable to decode all information bits).

Compressed mode by puncturing has some particularities, which can be recalled by reference to the UMTS system for example.

One feature of UMTS is the possibility to transport multiple services on a same connection, i.e. multiple transport channels on a same physical channel. Such Transport Channels or TrCHs are separately processed according to a channel coding scheme (including error detecting, error correcting, rate matching, and interleaving) before being time-multiplexed to form a Coded Composite Transport Channel or CCTrCH to be mapped onto one or more physical channels. Processing according to this channel coding scheme is on a TTI (Transmission Time Interval) basis. In this channel coding scheme, rate matching includes the two techniques of puncturing and repeating; besides, an inter-frame interleaving is performed on the TTI length, or interleaving depth. Then each TTI is segmented into frames, and, after that, time-multiplexing and mapping on the physical channlel(s) are performed on a frame basis. Besides, each of the different transport channels TrCHi (i=1, . . . n) which are multiplexed to form a CCTrCH has its own TTI length, noted TTIi.

More information on these aspects of UMTS can be found in Technical Specification 3G TS25 212 V3.0.0 (1999–10).

Puncturing in compressed mode, which is included in rate matching, and which an be provided in addition to puncturing or repetition in normal mode, can either be performed on a frame basis or on a TTI basis.

If puncturing in compressed mode is performed on a frame basis, the above-recalled method according to the prior patent application still applies.

If puncturing in compressed mode is performed on a TTI basis, the transmission rate increase due to compressed mode applies to all frames of a TTI. Now, in the UMTS standard, TTI can be equal to 10, 20, 40, or 80 ms. Besides, as already mentioned, each of the different transport channels TrCHi (i=1, . . . n) which are multiplexed to form a CCTrCH has its own TTI length, noted TTIi. This is illustrated in FIG. 1, taking the example of three multiplexed transport channels noted TrCH1, TrCH2, TrCH3, and taking the example of TTI=40 ms for TrCH1, TTI=20 ms for TrCH2, TTI=10 ms for TrCH1, and a frame length equal to 10 ms. In this figure, the case of four consecutive frames sent on a physical channel is illustrated by way of example, and the case of a transmission gap TG overlapping two consecutive frames (in the circumstances the second and the third one of the four illustrated frames) is also illustrated by way of example.

In standardization proposal TSGR1#10(00)0086 presented at the 3GPP TSG-RAN Working Group 1 meeting #10 Beijing, China, Jan. 18–21, 2000, a modification of the above recalled method was presented for the case where the frames are compressed using puncturing and where puncturing is performed on a TTI basis.

According to this proposal of modification:

If there are "n" different TTI lengths in the CCTrCH (i.e. "n" transport channels multiplexed into the CCTrCH), then "n" separate DeltaSIR values (defined as coding gain degradation due to "too much" puncturing) DeltaSIR, i=1 . . . n, one for each TTI length, are signaled to the UE. These "n" DeltaSIR values should then be used in the following way for the outer loop power control.

For each frame the offset of the target SIR in compressed mode compared to target SIR in normal mode is:

$$\Delta SIRframe=\max(\Delta SIR1, \ldots, \Delta SIRn)$$

where:

$$\Delta SIRi=\Delta SIRi__compression+\Delta SIRi__coding$$

If there is no transmission gap within the current TTIims for the TTI length of TTIi (i.e. within the current TTI of the transport channel TrCHi which is multiplexed inside this frame, as may also be understood by referring to FIG. 1), then:

$$\Delta SIRi__compression=0$$

$$\Delta SIRi__coding=0$$

If there is a transmission gap within the current TTIims for the TTI length of TTIi, then:

$$\Delta SIRi_compression=10 \log (F_i \cdot N/(F_i \cdot N-TGL_{Fi}))$$

$$\Delta SIRi_coding=DeltaSIRi$$

Here $F_i$ is the number of frames in the TTIi, $TGL_{Fi}$ is the gap length in slots (either from one gap, or a sum of several gaps) within those $F_i$ frames, and N is the number of slots per frame (N=15 in the UMTS standard).

This method (hereafter also referred to as second method) therefore requires additional signaling compared to the above-recalled one (hereafter also referred to as first method) according to the above-mentioned prior patent application. Indeed, the values DeltaSIRi are signaled for each value of "i", i.e. for all possible values of TTI for the TrCHs multiplexed into the CCTrCH, therefore up to four values (the four possible values for TTI). Thus this second method does not make an efficient use of available radio resources, or needlessly contributes to a traffic increase in the network. Besides this second method increases the complexity, compared to the first one.

What would be desirable is a method which, notwithstanding the particularities of the compressed mode by puncturing, would not involve an increase in the amount of signaling compared to the first method, while still providing an efficient compensation for this type of compressed mode.

What would also be desirable is a method which, notwithstanding these particularities, would involve as few changes as possible compared to this first method, in order to be as far as possible applicable to both types of compressed modes (by puncturing and by reducing the spreading factor).

What would also be desirable is a method which would not involve a further increase in the amount of signalling and the complexity compared to the first method, while still providing an efficient compensation, in special cases of occurrence of compressed frames, such as when a transmission gap overlaps two consecutive frames.

In other words, there is a general need to simplify the signalling and the architecture of the equipments, while still providing an efficient compensation for outer-loop power control in compressed mode, in various types of compressed mode and/or various cases of occurrence of compressed frames.

SUMMARY OF THE INVENTION

An object of the present invention is a method for setting a transmission quality target value for power control in a mobile radiocommunication system, a method herein:

an offset is applied in an anticipated way to said transmission quality target value to compensate for the effects of a compressed mode whereby transmission is interrupted during transmission gaps in compressed frames, and the transmission rate is correspondingly increased to compensate for said transmission gaps, said offset includes a first component intended to compensate for the effects of said transmission rate increase, and a second component intended to compensate for the effects of said transmission gaps, said transmission rate increase applies not only for a compressed frame, but for a plurality of frames including a compressed frame, and said second component is not applied for all frames of said plurality of frames, but only for said compressed frame and/or for at least one frame, or recovery frame, following said compressed frame.

Another object of the present invention is a method for setting a transmission quality target value for power control in a mobile radiocommunication system, a method wherein:

an offset is applied in an anticipated way to said transmission quality target value to compensate for the effects of a compressed mode whereby transmission is interrupted during transmission gaps in compressed frames, and the transmission rate is correspondingly increased to compensate for said transmission gaps, said offset includes a first component intended to compensate for the effects of said transmission rate increase, and a second component intended to compensate for the effects of said transmission gaps, said transmission rate increase applies for a transmission time interval including a compressed frame, a plurality of transport channels are time-multiplexed in each frame of a physical channel whose transmit power is controlled by said power control, the number of frames of said transmission time interval is likely to be different for each of said transport channels, and said second component is applied for said compressed frame and/or for at least one frame, or recovery frame, following said compressed frame, whatever said number of frames.

According to another object, said first component is applied for each frame of aid plurality of frames.

According to another object, said first component is only applied for said compressed frame and said at least one recovery frame.

According to another object, said second component has different values for aid compressed frame and said at least one recovery frame, respectively a compressed-frame value and a recovery-frame value.

According to another object, different transmission gaps may have different transmission gap lengths, and said compressed-frame value and/or recovery frame value may be different for said different transmission gap lengths.

According to another object, said offset is determined to enable each of said transport channels to reach its required quality of service.

Another object of the present invention is a method for setting a transmission quality target value for power control in a mobile radiocommunication system, a method wherein:

an offset is applied in an anticipated way to said transmission quality target value to compensate for the effects of a compressed mode whereby transmission is interrupted during transmission gaps in compressed frames, and the transmission rate is correspondingly increased to compensate for said transmission gaps, said offset includes a first component intended to compensate for the effects of said transmission rate increase, and a second component intended to compensate for the effects of said transmission gaps, said transmission rate increase, either applies not only for a compressed frame, but for a transmission time interval including a compressed frame, or only applies for a compressed frame, depending on whether a first or a second type of compressed mode is used, and said second component is applied for said compressed frame and/or for at least one frame, or recovery frame, following said compressed frame, in either of said first or second type of compressed mode.

According to another object, a plurality of transport channels are time-multiplexed in each frame of a physical channel whose transmit power is controlled by said power control, the number of frames of said transmission time interval is likely to be different for each of said transport channels, and said second component is only applied for said compressed frame and/or for said at least one recovery frame, whatever said number of frames.

According to another object, said first type of compressed mode is a compressed mode by puncturing.

According to another object, said second type of compressed mode is a compressed mode by reduction of spreading factor, in a mobile radiocommunication system of CDMA type.

According to another object, in said first type of compressed mode, said first component is applied for each frame of said transmission time interval.

According to another object, in said first type of compressed mode, said first component is only applied for said compressed frame and said at least one recovery frame.

According to another object, in said second type of compressed mode said first component applies for said compressed frame.

According to another object, said second component has different values for said compressed frame and said at least one recovery frame, respectively a compressed-frame value and a recovery-frame value.

According to another object, different transmission gaps may have different transmission gap lengths, and said compressed-frame value and/or recovery frame value may be different for said different transmission gap lengths.

According to another object, a plurality of transport channels are time-multiplexed in each frame of a physical channel whose power is controlled by said power control, and said offset is determined to enable each of said transport channels to reach its required quality of service.

Another object of the present invention is a method for setting a transmission quality target value for power control in a mobile radiocommunication system, a method wherein:

an offset is applied in an anticipated way to said transmission quality target value to compensate for the effects of a compressed mode whereby transmission is interrupted during transmission gaps in compressed frames, and the transmission rate is correspondingly increased to compensate for said transmission gaps, said offset includes a first component intended to compensate for the effects of said transmission rate increase, and a second component intended to compensate for the effects of said transmission gaps, said second component is applied for a compressed frame and for at least one frame, or recovery frame, following said compressed frame, in the case where said second component has different values for said compressed frame and for said at least one recovery frame, respectively a compressed-frame value and a recovery-frame value, and in the case where two consecutive frames, respectively a first frame and a second frame, are compressed frames, the value of said second component for said second frame is determined based on said recovery-frame value and/or said compressed-frame value.

According to another object, the value of said second component for said second frame is the recovery-frame value.

According to another object, the value of said second component for said second frame is the compressed-frame value, and the value of said second component for a frame following said second frame is the recovery-frame value.

According to another object, the value of said second component for said second frame is a combination of the recovery-frame value and the compressed-frame value.

According to another object, said combination is the sum of the recovery-frame value and the compressed-frame value.

According to another object of the present invention, said transmission quality is represented by a signal-to-interference ratio.

According to another object of this invention, said mobile radiocommunication system is of CDMA type.

According to another object of this invention, said power control is performed in the uplink transmission direction of said mobile radiocommunication system.

According to another object of this invention, said power control is performed in the downlink transmission direction of said mobile radiocommunication system.

Another object of the present invention is a mobile radiocommunication system including at least a transmitting entity and a receiving entity involved in said power control, wherein means are provided in a first one of said entities, for applying an offset to a transmission quality target value according to any of said methods.

According to another object of this invention, means are provided in said first entity for determining and/or updating said offset.

According to another object of this invention, means are provided in a second one of said entities for signalling to said first entity previous values necessary for determining and/or updating said offset.

According to another object of this invention, means are provided in a second one of said entities for signalling said offset to said first entity.

According to another object of this invention, means are provided in a second one of said entities for signalling to said first entity the occurrence of said compressed mode.

According to another object of this invention, means are provided in a second one of said entities for signalling said offset to said first entity together with the signalling of the occurrence of said compressed mode.

According to another object of this invention, means are provided in a second one of said entities for signalling said offset to said first entity together with the signalling of compressed mode parameters.

According to another object of this invention, said signalling is performed for each compressed frame.

According to another object of this invention, in the case where compressed frames occur periodically, said signalling is performed once for all, for all compressed frames of a thus defined period.

According to another object of this invention, said signaling includes signaling said second component only.

According to another object, said signalling of said second component includes signalling said compressed-frame value and/or said recovery-frame value.

According to another object of this invention, means are provided in any one of said two entities for recording said offset.

According to another object of this invention, one of said two entities is a mobile radiocommunication network entity.

According to another object of this invention, one of said two entities is a mobile station.

Another object of the present invention is a mobile radiocommunication network entity comprising means for applying an offset to a transmission quality target value according to any of said methods, in uplink.

Another object of the present invention is a mobile station comprising means for applying an offset to a transmission quality target value according to any of said methods, in downlink.

Another object of this invention is a mobile radiocommunication network entity comprising, for enabling a mobile station to apply an offset according to any of said methods, in downlink:

means for signalling said offset to said mobile station.

According to another object of this invention, said mobile radiocommunication network entity comprises:

means for signalling to said mobile station the occurrence of said compressed mode.

According to another object of this invention, said mobile radiocommunication network entity comprises:

means for signalling said offset to said mobile station, together with the signalling of the occurrence of said compressed mode.

According to another object of this invention, said signalling is performed together with the signalling of compressed mode parameters.

According to another object of this invention said signalling is performed for each compressed frame.

According to another object of this invention, in the case where compressed frames occur periodically, said signalling is performed once for all, for all compressed frames of a thus defined period.

According to another object of this invention, said signalling includes signalling said second component only.

According to another object, said signalling of said second component includes signalling said compressed-frame value and/or said recovery-frame value.

BRIEF DESCRIPTION OF THE DRAWINGS

These and other objects of the present invention will become more apparent from the following description taken in conjunction with the accompanying drawings:

FIG. 2 is a diagram intended to illustrate an example of means which may be used in a mobile station and in a mobile radiocommunication network entity to perform a method according to the present invention, for uplink power control, FIG. 3 is a diagram intended to illustrate an example of means which may be used in a mobile radiocommunication network entity and in a mobile station, to perform a method according to the present invention, for downlink power control.

MORE DETAILED DESCRIPTION OF THE INVENTION

Figure 1:
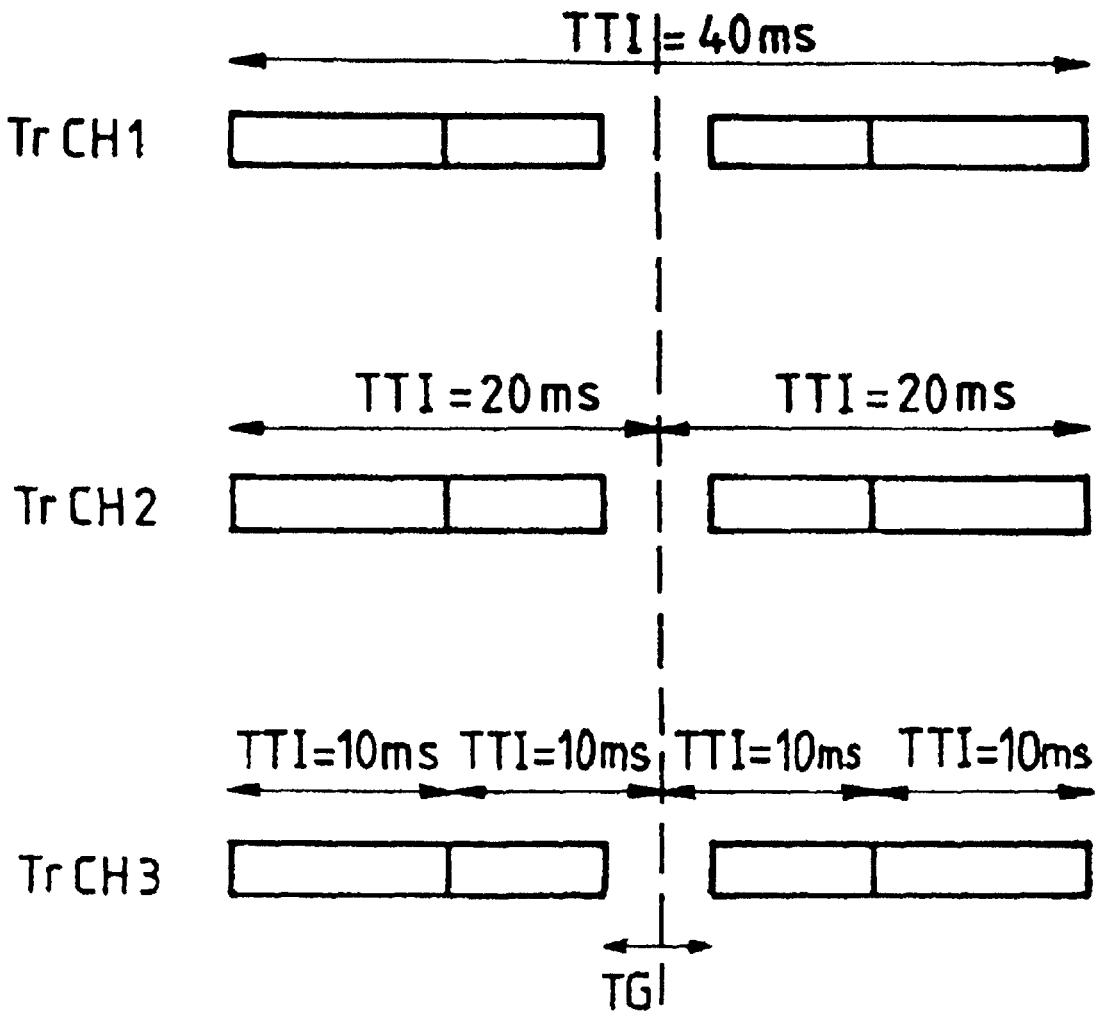
FIG. 1 is a diagram intended to illustrate some particularities of the compressed mode by puncturing, for example in the case of the UMTS standard.

The invention may also be explained in the following way.

In compressed mode by reducing the spreading factor, the target SIR needs to be different from the target SIR in normal mode for mainly two reasons:

For the compressed frame, the net bit rate is increased and thus the target SIR is increased in the same proportion. The target SIR increase indB is equal to 10 log ($R_{CF}$R), where R is the instantaneous net bit rate before and after the compressed frame and $R_{CF}$ is the instantaneous net bit rate during the compressed frame (it being understood that the term "instantaneous bit rate" means that for a compressed frame, the time period used to calculate this rate is not the whole frame period but only the fraction of this frame period where data are transmitted); for example, 10log($R_{CF}$/R) is equal to 3 dB for UMTS, where the matching rate is the same for compressed and non compressed frames, when compressed mode by reducing the spreading factor by a factor of 2 is used. This increase can be computed in the MS and thus does not need to be signaled.

Since the inner-loop power control is stopped during the transmission gap, the performance is decreased during several slots after the transmission gap. This effect mainly occurs during the compressed frame and during one frame (called recovery frame) following the compressed frame. It is negligible for other frames.

Thus, the target SIR needs to be increased mainly for compressed and recovery frames as proposed in the above-mentioned first method.

The compressed mode by puncturing is very similar. The only (but major) difference is that the net bit rate is modified:

On the compressed frame when the compressed mode is performed by reducing the spreading factor of the physical channel.

On the whole TTI containing the transmission gap for each transport channel of the considered CCTrCh when compressed mode is performed by puncturing. Indeed in the UMTS standard, puncturing is performed on a TTI per TTI basis and for each transport channel of the CCTrCh.

Thus, when compressed mode is performed using puncturing, the target SIR needs to be changed for the following reasons:

For each transport channel of the CCTrCh: in frames that belong to the TTI where there is a transmission gap, the bit rate is increased and thus the target SIR is increased in the same proportion. Let F be the number of frames in the TTI. Since only (N*F−TGL) slots are used in the TTI where there is a transmission gap compared to N*F slots in other TTIs, the target SIR increase in dB is equal to 10 log (F*N/(F*N−TGL)) for all frames of the TTI (and not only the compressed frame). This increase can be computed in the MS and thus does not need to be signaled.

Since the inner-loop power control is stopped during the transmission gap, the performance is decreased during several slots after the transmission gap. This effect however mainly occurs during the compressed frame and during one frame (called recovery frame) following the compressed frame, and not for all frames of the TTI, as recognized and advantageously used by the present invention in order to reduce the amount of required signaling. Indeed, if the component of the target SIR offset which is intended to compensate for the effects of the transmission gap is only applied for the compressed frame and for the recovery frame, this component does not need to be different for each of the TrCHi which are multiplexed into the CCTrCH. Besides, these frames are sufficient to compensate for the effects of power control interruption during a transmission gap, and they are also sufficient to compensate for the effects of coding degradation due to a transmission gap for each TrCHi, because this degradation mainly affects the shortest TTIs. This component can only, at least if necessary, be different for each type of frame (i.e. compressed or recovery) for which it is applied, but this, nevertheless, still requires less signaling than in the above-mentioned second method.

Besides, this still applies to the case of more than one recovery frame, if more than one recovery frame is found necessary to compensate for the effects of a transmission gap, and this also applies to the case where this compensation would be performed on the compressed frame only, or on the recovery frame(s) only.

As a conclusion, when the compressed mode is performed using puncturing, the target SIR would need to be changed, to compensate for the transmission rate increase provided by a compressed frame, not only during the compressed frame but also in all frames that belong to the TTI containing the transmission gap for each transport channel.

However, even if the compressed mode is performed using puncturing, the target SIR needs to be changed, to compensate for the degradation due to a transmission gap, only during the compressed frame and/or at least one recovery frame following the compressed frame.

It is to be noted that, in the UMTS system, this is different from the above-mentioned first method only when there is a TrCH having a TTI equal to or larger than 20 ms in the CCTrCH.

Moreover, since the puncturing is performed per transport channel, if we want that each transport channel reaches the required quality of service, the target SIR increase for the CCTrCh has to be determined accordingly. For example the target SIR increase due to the transmission rate increase in compressed mode by puncturing may be the maximum of the target SIR increase needed for each transport channel of the CCTrCh (obviously, other choices could be done). As already mentioned, this component of the target SIR increase does not need to be signaled to the UE. The other component of this target SIR increase, intended to compensate for the transmission gaps, can be determined according to various ways as described below, and may be signaled to the UE. However, compared to the above-mentioned second method, it does not need to be signaled for each TTIi (or each TrCHi), thereby enabling to reduce the amount of signaling, as already indicated.

To avoid the drawbacks of the above-mentioned second method, the present invention proposes for example the following algorithm:

For each frame, the target SIR offset during compressed mode, compared to normal mode is:

$$\Delta SIR = \max(\Delta SIR1_compression, \ldots, \Delta SIRn_compression) + \Delta SIR_coding$$

where "n" is the number of TTI lengths for all TrChs of the CCTrCh, $F_i$ is the length in number of frames of the i-th TTI and where ΔSIR_coding fulfills:

ΔSIR_coding=DeltaSIR for compressed frames

ΔSIR_coding=DeltaSIRafter for recovery frames

ΔSIR_coding=0 otherwise and ΔSIRi_compression is defined by:

ΔSIRi_compression=10 log $(N*F_i/(N*F_i-TGL_i))$ if there is a transmission gap within the current TTI of length $F_i$ frames, where $TGL_i$ is the gap length in number of slots (either from one gap or a sum of gaps) in the current TTI of length $F_i$ frames, and N is the number of slots per frame (N=15 in the UMTS standard)

ΔSIRi_compression=0 otherwise.

Finally, the algorithms for compressed modes by puncturing (as just described) and by reducing the spreading factor (as in the first method) can be combined into one algorithm as follows.

For each frame, the target SIR offset during compressed mode, compared to normal mode is:

$$\Delta SIR = \max(\Delta SIR1_compression, \ldots, \Delta SIRn_compression) + \Delta SIR_coding$$

where "n" is the number of TTI lengths for all TrChs of the CCTrCh, $F_i$ is the length in number of frames of the i-th Tri and where ΔSIR_coding fulfills:

ΔSIR_coding=DeltaSIR for compressed frames

ΔSIR_coding=DeltaSIRafter for recovery frames

ΔSIR_coding=0 otherwise and ΔSIRi_compression is defined by:

ΔSIRi_compression=10 log $(N*F_i/(N*F_i-TGL_i))$ if there is a transmission gap within the current TTI of length $F_i$ frames, where $TGL_i$ is the gap length in number of slots (either from one gap or a sum of gaps) in the current TTI of length $F_i$ frames ΔSIRi_compression=0 otherwise If the frames are compressed by reducing the spreading factor:

ΔSIRi_compression=10 log $(R_{CF}/R)$ for each compressed frame, where R is the instantaneous net bit rate before and after the compressed frame and $R_{CF}$ is the instantaneous net bit rate during the compressed frame (it being understood that the term "instantaneous bit rate" means that for a compressed frame, the time period used to calculate this rate is not the whole frame period but only the fraction of this frame period where data are transmitted); for example, in downlink, 10log $(R_{CF}/R)$ is equal to 3 dB for UMTS, where the matching rate is the same for compressed and non compressed frames, when compressed mode by reducing the spreading factor by a factor of 2 is used. In uplink, on the contrary, ΔSIRi_compression is equal to 10 log ((15−TGL)/15) because the matching rate is not the same for compressed and non compressed frames. Besides, in the case where the information rate is simply reduced, in order not to have to compress the frames by modifying the repetition/puncturing rate and/or the spreading factor (this method also being referred to as "higher layer scheduling"), the term ΔSIRi_compression is equal to zero.

ΔSIRi_compression=0 otherwise.

The invention also proposes, in either of these two algorithms, and also by way of example:

In the particular case where the transmission gap overlaps two frames (case also referred to as "double-frame method" is UMTS), the second compressed frame (with the second part of the transmission gap) is considered as the recovery frame (ΔSIR_coding=DeltaSIRafter). Thus, in this case, the first frame following the two consecutive compressed frames is not considered as a recovery frame (ΔSIR_coding=0).

Since several compressed mode patterns may be used simultaneously (i.e. one or more frames compressed by reducing the spreading factor may occur in a TTI already including one or more frames compressed by puncturing), it may happen that several target SIR offsets from different compressed mode patterns apply to the same frame. In this case, all offsets are added and the total target SIR offset is applied to the frame.

In these two algorithms, max (ΔSIR1_compression, . . . , ΔSIRn_compression) corresponds to said first component of the target SIR offset ΔSIRframe (it being noted that, as defined in the last algorithm, it applies to both types of compressed mode, by puncturing or by reducing the spreading factor), and ΔSIR_coding corresponds to said second component of this target SIR offset.

In these two algorithms the second component ΔSIR_coding of the target SIR offset has different values for the compressed and the recovery frames, respectively a compressed-frame value DeltaSIR, and a recovery-frame value DeltaSIRafter.

It should be understood that the above algorithms have only been disclosed by way of example, and that some variants could of course be envisaged, for example, and in an non-exhaustive way:

In the particular case where the transmission gap overlaps two frames, the second compressed frame (with the second part of the transmission gap) could alternatively be considered as a compressed frame (ΔSIR_coding=DeltaSIR) and the first frame following these two consecutive compressed frames could be considered as a recovery frame (ΔSIR_coding=DeltaSiRafter). In yet another alternative, the second compressed frame could be considered as a compressed and recovery frame (ΔSIR_coding=DeltaSIR+DeltaSIRafter, or any other combination). Or more generally, and in order to reduce the amount of signalling and the complexity, the component ΔSIR_coding would be determined based on the values DeltaSIR and DeltaSIRafter, without signalling any further value(s).

Besides, this solution (for the case where the transmission gap overlaps two consecutive frames) also applies to the above-mentioned first method.

More generally, the invention uses the idea of compressed and recovery frames to simplify the signalling and the architecture of the equipments, while still providing an efficient compensation for the compressed mode, in various types of compressed mode and/or various cases of occurrence of compressed frames.

Besides, in general, the compressed-frame value and the recovery-frame value may, or not, be different. Only for illustration and without any limitative character, if a transmission gap does not overlap two consecutive frames, the recovery-frame value could rather be chosen inferior to the compressed-frame value, and if a transmission gap overlaps two consecutive frames, the recovery-frame value could rather be chosen superior to the compressed-frame value (though in this last case it could also depend on various parameters such as the transmission gap length and the position of the transmission gap).

Besides, the transmission gap length may be different for different transmission gaps; in such a case said compressed-frame value and/or recovery frame value may be different for said different transmission gap lengths.

It can be seen from the last disclosed algorithm that it presents very few differences for the two types of compressed mode (by puncturing and by reducing the spreading factor). These differences could still be reduced by providing that for frames other than compressed and recovery frames, we could always set ΔSIR_compression=0. This would make the scheme a little simpler and is a good approximation. Indeed for the UMTS standard, TGL<8 and F=4 or 8 for these frames (since they are not a compressed or recovery frame). Thus, 10 log (F*N/(F*N−TGL) is about 0.54 dB.

With these algorithms, as with the above-mentioned first method, ΔSIR_coding is signaled for the compressed and recovery frames. It could also be signaled only for compressed frames, taking a predefined value for the recovery frames (0, the same value as in the compressed frames, . . . ) as in the above-mentioned first method. It could also be signaled only for recovery frame(s), taking a predefined value for the compressed frames (0, the same value as in the recovery frames, . . . )

For compressed and recovery frames, ΔSIR could be directly signaled to the MS by the BTS (i.e. the two components of this offset, and not only the second one, could be signaled).

The function "max (ΔSIR1_compression, . . . , ΔSIRn_compression)" could be replaced by another function such as for example "means (ΔSIR1_compression, . . . , ΔSIRn_compression)", where "mean" stands for any type of averaging function (arithmetic, geometric, harmonic, . . . ), or 0.

More generally, instead of distinguishing the two methods for compressed mode: compressed mode by puncturing, compressed mode by reducing the spreading factor, the proposed algorithm can rather distinguish two situations:

the net bit rate is increased on a frame basis and only in the compressed frame (in particular compressed mode by reducing the spreading factor), the net bit rate is increased for each transport channel and on a TTI basis (in particular compressed mode by puncturing), or more generally it is increased not only for a compressed frame but for a plurality of frames including the compressed frame.

The signaled value ΔSIR_coding, or second component of said offset, could have a negative value, which could for example enable to compensate for a too large value of the first component of said offset, in particular in the case where said first component is obtained according to the function max (ΔSIR1_compression, . . . , ΔSIRn_compression).

In the same way as disclosed in the above-mentioned prior patent application, in downlink for example, the UE will have to increase the target SIR by this offset, and then decrease it back by the same value when this increase no longer applies. This target SIR variation is done additionally to the usual downlink outer-loop algorithm that will have to take it into account. The Node B may increase simultaneously its transmit power, and then decrease it back by the same value when it no longer applies, in order for the downlink received SIR to be as quickly as possible close to the new target SIR.

In the same way as indicated in the above-mentioned prior patent application, the component (or second component) of the target SIR offset which needs to be signaled to the UE, may have predetermined values, which may be determined in any way.

For example these values may be seen as system parameters and be determined accordingly by the operator of the system. They may also be prealably determined, in particular by simulation. In either case, they may be updated during operation. They may also be determined during operation based on previously obtained values, for example by averaging. In any case the obtention mode of said predetermined values should take into account all factors that are likely to influence said component of said offset, or combinations of such factors.

Besides, they may be known in any one of the two entities (transmitting entity and receiving entity) involved in a power control process, to be used locally in this entity, or signalled to the other one of said entities, to be used in this entity.

Besides, they may be determined and/or updated in any of said two entities, based on statistics on previously obtained values, available either locally in this entity, or signalled to this entity by the other one of said entities.

Besides, they may be recorded in any one of said entities, to be recovered when necessary.

Besides, the occurrence of the compressed mode may either be known locally by the entity in charge of applying the corresponding offset, or signalled to this latter entity by the other one of said entities.

Thus, every possibility may be envisaged; therefore the examples given in this description should be understood as illustrative only, and having no limitative character.

FIG. 2 is a diagram intended to illustrate an example of means which may be used in a mobile radiocommunication network entity, noted 40, and in a mobile station noted 41, to perform a method according to the present invention, for uplink power control.

Mobile radiocommunication network entity 40 may also for example comprise, for performing said method in said [downlink] *uplink* transmission direction (and further to other classical means not mentioned here):

means 42 for implementing for example one of the two above disclosed algorithms, depending on which type (s) of compressed mode are used.

Mobile radiocommunication network entity 40 may also for example comprise, for performing said method in said [uplink] *downlink* transmission direction (and further to other classical means not mentioned here):

means, also noted 42 for, upon the occurrence of the compressed mode, controlling the inner-loop power control algorithm, in an anticipated way.

The offsets to be applied according to the above-disclosed algorithms may for example have predetermined values, which may for example be determined according to any of the above mentioned possibilities.

In any case, mobile radiocommunication network entity 40 for example may comprise:

means 42' for recording said offsets.

A mobile station 41 (or User Equipment UE in UMTS) may for example comprise, for performing said method in said uplink transmission direction (and further to other classical means not mentioned here):

means 43 for signalling to a mobile radiocommunication network entity the occurrence of the compressed mode.

FIG. 3 is a diagram intended to illustrate an example of means which may be used in a mobile radiocommunication network entity, noted 45, and in a mobile station, noted 46, to perform a method according to the present invention, for downlink power control.

A mobile station 46 (or User Equipment UE in UMTS) may for example comprise, for performing said method in said downlink transmission direction (and further to other classical means not mentioned here):

means 48 for implementing for example one of the two above disclosed algorithms, depending on which type (s) of compressed mode are used.

Mobile station 46 may also for example comprise, for performing said method in said uplink transmission direction (and further to other classical means not mentioned here):

means, also noted 48 for, upon the occurrence of the compressed mode, controlling the inner-loop power control algorithm, in an anticipated way.

Such offsets may for example have predetermined values, which may for example be determined according to any of the above mentioned possibilities.

In one embodiment, mobile station 46 may comprise:

means 48' for recording said offsets.

In another embodiment, mobile radiocommunication network entity 45, such as in particular BTS for "Base Transceiver Station" (or Node B in UMTS) and/or BSC for "Base Station Controller" (or RNC for "Radio Network Controller" in UMTS), may for example comprise, for performing said method in said downlink transmission direction (and further to other classical means not mentioned here):

signalling means 47 for signalling said offsets, or advantageously only said second component of said offsets, to mobile station 46.

Mobile radiocommunication network entity 45 may also for example comprise:

signalling means also noted 47, for signalling to a mobile station the occurrence of the compressed mode.

Advantageously, mobile radiocommunication network entity 45 may comprise:

signalling means (also noted 47) for signalling said offset (or advantageously only said second component of said offset) to mobile station 46, together with the signalling of the occurrence of the compressed mode.

Besides, said signalling may be performed for each compressed frame.

Alternatively, in the case were compressed frames occur periodically, said signalling may be performed once for all, for all compressed frames of a thus defined period, still in order to reduce the required signalling.

What is claimed is:

1. A method for setting a transmission quality target value for power control in a mobile radiocommunication system, [wherein] *the method comprising*:

an offset is applied in an anticipated way to said transmission quality target value to compensate for the effects of a compressed mode whereby transmission is interrupted during transmission gaps in compressed frames, and the transmission rate is correspondingly adapted to compensate for said transmission gaps, said offset includes a first component intended to compensate for the effects of said transmission rate adaptation, and a second component intended to compensate for the effects of said transmission gaps, said transmission rate adaptation applies for a transmission time interval including a compressed frame, and said second component is applied only for said compressed frame and/or for at least one frame, or recovery frame, following said compressed frame.

2. [A method for setting a transmission quality target value for power control in a mobile radiocommunication system, a method wherein:] *A method according to claim 1, wherein:*

[an offset is applied in an anticipated way to said transmission quality target value to compensate for the effects of a compressed mode whereby transmission is interrupted during transmission gaps in compressed frames, and the transmission rate is correspondingly adapted to compensate for said transmission gaps,]

[said offset includes a first component intended to compensate for the effects of said transmission rate adaptation, and a second component intended to compensate for the effects of said transmission gaps,]

[said transmission rate adaptation applies for a transmission time interval including a compressed frame,]

a plurality of transport channels are time-multiplexed in each frame of a physical channel whose transmit power is controlled by said power control, the number of frames of said transmission time interval is likely to be different for each of said transport channels, and said second component is applied for said compressed frame and/or for at least one frame, or recovery frame, following said compressed frame, whatever said number of frames.

[3. A method according to claim 1 or 2, wherein said first component is applied for each frame of said transmission time interval.]

[4. A method according to claim 1 or 2, wherein said first component is applied only for said compressed frame and said at least one recovery frame.]

5. A method according to claim 1[or 2], wherein said second component has, for said compressed frame and said at least one recovery frame, respectively, a compressed-frame value and a recovery-frame value.

[6. A method according to claim 5, wherein different transmission gaps may have different transmission gap lengths, and said compressed-frame value and/or recovery frame value may be different for said different transmission gap lengths.]

[7. A method according to claim 2, wherein said offset is determined to enable each of said transport channels to reach its required quality of service.]

8. [A method for setting a transmission quality target value for power control in a mobile radiocommunication system, a method wherein:] *A method according to claim 1, wherein:*

[an offset is applied in an anticipated way to said transmission quality target value to compensate for the effects of a compressed mode whereby transmission is interrupted during transmission gaps in compressed frames, and the transmission rate is correspondingly increased to compensate for said transmission gaps,]

[said offset includes a first component intended to compensate for the effects of said transmission rate increase, and a second component intended to compensate for the effects of said transmission gaps,]

said transmission rate [increase] *adaptation*, either applies [not only] for a compressed frame, [but for a transmission time interval including a compressed frame,] or only applies for a compressed frame, depending on whether a first or a second type of compressed mode is used, and said second component is applied for said compressed frame and/or for at least one frame, or recovery frame, following said compressed frame, in either of said first or second type of compressed mode.

9. A method according to claim 8, wherein a plurality of transport channels are time-multiplexed in each frame of a physical channel whose transmit power is controlled by said power control, the number of frames of said transmission time interval is likely to be different for each of said transport channels, and said second component is only applied for said compressed frame and/or for said at least one recovery frame, whatever said number of frames.

10. A method according to claim 8, wherein said first type of compressed mode is a compressed mode by puncturing.

11. A method according to claim 8, wherein said second type of compressed mode is a compressed mode by reduction of spreading factor, in a mobile radiocommunication system of CDMA type.

[12. A method according to claim 8, wherein, in said first type of compressed mode, said first component is applied for each frame of said transmission time interval.]

[13. A method according to claim 8, wherein, in said first type of compressed mode, said first component is only applied for said compressed frame and said at least one recovery frame.]

[14. A method according to claim 8, wherein, in said second type of compressed mode said first component is applied for said compressed frame.]

[15. A method according to claim 8, wherein said second component has, for said compressed frame and said at least one recovery frame, respectively a compressed-frame value and a recovery-frame value.]

[16. A method according to claim 15, wherein different transmission gaps may have different transmission gap lengths, and said compressed-frame value and/or recovery frame value are different for said different transmission gap lengths.]

[17. A method according to claim 8, wherein a plurality of transport channels are time-multiplexed in each frame of a physical channel whose power is controlled by said power control, and said offset is determined to enable each of said transport channels to reach its required quality of service.]

18. A method for setting a transmission quality target value for power control in a mobile radiocommunication system, [wherein] *the method comprising*:

an offset is applied in an anticipated way to said transmission quality target value to compensate for the effects of a compressed mode whereby transmission is interrupted during transmission gaps in compressed frames, and the transmission rate is correspondingly adapted to compensate for said transmission gaps, said offset includes a first component intended to compensate for the effects of said transmission rate adaptation, and a second component intended to compensate for the effects of said transmission gaps, said second component is applied for a compressed frame and/or for at least one frame, or recovery frame, following said compressed frame, said second component has a compressed-frame value and a recovery-frame value, respectively for said compressed frame and for said at least one recovery frame, and in the case where two consecutive frames, respectively a first frame and a second frame, are compressed frames, the value of said second component for said second frame is determined based on said recovery-frame value and/or said compressed-frame value.

19. A method according to claim 18, wherein the value of said second component for said second frame is the recovery-frame value.

20. A method according to claim 18, wherein the value of said second component for said second frame is the compressed-frame value, and the value of said second component for a frame following said second frame is the recovery-frame value.

[21. A method according to claim 18, wherein the value of said second component for said second frame is a combination of the recovery-frame value and the compressed-frame value.]

[22. A method according to claim 21, wherein said combination is the sum of the recovery-frame value and the compressed-frame value.]

[23. A method according to claim 1, 2, 8 or 18, wherein said transmission quality is represented by a signal-to-interference ratio.]

[24. A method according to claim 1, 2, 8 or 18, wherein said mobile radiocommunication system is of CDMA type.]

25. A method according to claim 1[, 2, 8] or 18, wherein said power control is performed in the uplink transmission direction of said mobile radiocommunication system.

26. A method according to claim 1[, 2, 8] or 18, wherein said power control is performed in the downlink transmission direction of said mobile radiocommunication system.

[27. A mobile radiocommunication system including at least a transmitting entity and a receiving entity involved in a power control, wherein means are provided in a first one of said entities, for applying an offset to a transmission quality target value according to claim 1, 2, 8 or 18.]

[28. A mobile radiocommunication system according to claim 27, wherein means are provided in said first entity for determining and/or updating said offset.]

[29. A mobile radiocommunication system according to claim 28, wherein means are provided in a second one of said entities for signalling to said first entity previous values necessary for determining and/or updating said offset.]

[30. A mobile radiocommunication system according to claim 27, wherein means are provided in a second one of said entities for signalling said offset to said first entity.]

[31. A mobile radiocommunication system according to claim 27, wherein means are provided in a second one of said entities for signalling to said first entity the occurrence of said compressed mode.]

[32. A mobile radiocommunication system according to claim 27, wherein means are provided in a second one of said entities for signalling said offset to said first entity together with the signalling of the occurrence of said compressed mode.]

[33. A mobile radiocommunication system according to claim 27, wherein signalling between said two entities for applying said offset if performed for each compressed frame.]

[34. A mobile radiocommunication system according to claim 27, wherein, in the case where compressed frames occur periodically, signalling between said two entities for applying said offset is performed once for all, for all compressed frames of a thus defined period.]

[35. A mobile radiocommunication system according to claim 27, wherein signaling between said two entities to apply said offset includes signaling said second component only.]

[36. A mobile radiocommunication system according to claim 35, wherein said signaling of said second component includes signalling said compressed-frame value and/or said recovery-frame value.]

[37. A mobile radiocommunication system according to claim 27, wherein means are provided in any one of said two entities for recording said offset.]

[38. A mobile radiocommunication system according to claim 27, wherein one of said two entities is a mobile radiocommunication network entity.]

[39. A mobile radiocommunication system according to claim 27, wherein one of said two entities is a mobile station.]

40. A mobile radiocommunication network entity comprising means for [applying an offset to a] *setting said* transmission quality target value*, and means for applying the offset to the transmission quality target value* according to claim 1[, 2, 8] or 18, in uplink.

41. A mobile station comprising means *for setting said transmission quality target value, and means* for applying [an] *the* offset to [a] *the* transmission quality target value according to claim 1[, 2, 8] or 18, in downlink.

42. A mobile radiocommunication network entity comprising*:*

*means* for enabling a mobile station to apply an offset to a transmission quality target value according to claim 1[, 2, 8] or 18, in downlink[:]*; and* means for [signalling] *signaling* said offset to said mobile station.

43. A mobile radiocommunication network entity according to claim 42, comprising:

means for [signalling] *signaling* to said mobile station the occurrence of said compressed mode.

44. A mobile radiocommunication network entity according to claim 42, comprising:

means for [signalling] *signaling* said offset to said mobile station, together with the signalling of the occurrence of said compressed mode.

45. A mobile radiocommunication network entity according to claim 42, wherein said [signalling] *signaling* is performed together with the [signalling] *signaling* of compressed mode parameters.

46. A mobile radiocommunication network entity according to claim 42, wherein said [signalling] *signaling* is performed for each compressed frame.

47. A mobile radiocommunication network entity according to claim 42, wherein, in the case where compressed frames occur periodically, said [signalling] *signaling* is performed once for all, for all compressed frames of a thus defined period.

48. A mobile radiocommunication network entity according to claim 42, wherein said [signalling] *signaling* includes [signalling] *signaling* said second component only.

49. A mobile radiocommunication network entity according to claim 48, wherein said signaling of said second component includes [signalling] *signaling* said compressed-frame value and/or said recovery-frame value.

[50. A method according to claim 5, wherein said compressed-frame value and said recovery-frame value are identical.]

[51. A method according to claim 5, wherein said compressed-frame value and said recovery-frame value are different.]

[52. A method according to claim 2, wherein said first component is defined by max (ΔSIR1_compression, . . . , ΔSIRn_compression), where "n" is the number of transmission time interval (TTI) lengths for all transport channels (TrChs) of a coded composite transport channel (CCTrCh), and wherein, if compressed mode is performed by puncturing, ΔSIRi_compression has a value defined by:

if there is a transmission gap within the current transmission time interval (TTI) for the $i^{th}$ transmission time interval length (with i=1, . . . n):

$\Delta SIRi_compression = 10 \log (M*F_i/(N*F_i - TGL_i))$ where $TGL_i$ is the gap length in number of slots in the current transmission time interval (TTI) of length $F_i$ frames, and N is the On number of slots per frame, or a value zero otherwise.]

[53. A method according to claim 15, wherein said compressed-frame value and said recovery-frame value are identical.]

[54. A method according to claim 15, wherein said compressed-frame value and said recovery-frame value are different.]

[55. A method according to claim 8, wherein said first component is defined by:

max (ΔSIR1_compression, . . . , ΔSIRn_compression), where "n" is the number of transmission time interval (TTI) lengths for all transport channels (TrChs) of a coded composite transport channel (CCTrCh), and ΔSIRi_compression has:

if compressed mode is performed by puncturing, a first value if there is a transmission gap within the current transmission time interval (TTI) for the $i^{th}$ transmission time interval length (with i=1, . . . n), or a value zero otherwise, if compressed mode is performed by reducing the spreading factor, a second value if the current frame is a compressed frame, or a value zero otherwise, or if compressed mode is performed by higher layer scheduling, a value zero.]

[56. A method according to claim 55, wherein said first value of ΔSIRi_compression is defined by:

ΔSIRi_compression=10 log ($M*F_i/(N*F_i-TGL_i)$) where $TGL_i$ is the gap length in number of slots in the current transmission time interval (TTI) of length $F_i$ frames, and N is the number of slots per frame.]

[57. A method according to claim 55, wherein said second value of ΔSIRi_compression is defined by:

ΔSIRi_compression=10log($R_{CF}$/R), where R is the instantaneous net bit rate during a normal frame and $R_{CF}$ is the instantaneous net bit rate during the current compressed frame.]

[58. A method according to claim 55, wherein said second value of ΔSIRi_compression is defined by:

ΔSIRi_compression=3 dB in the case of compressed mode by reducing the spreading factor by a factor of two.]

[59. A method according to claim 18, wherein said second component is not applied for the frame following said second frame.]

[60. A method according to claim 18, wherein, in the case where a transmission gap overlaps two frames, said second component (ΔSIR_coding) has:

a compressed-frame value (DeltaSIR) for a compressed frame, with a first part of a transmission gap, a recovery-frame value (DeltaSIRafter) for a recovery frame, with a second part of a transmission gap, or a value zero otherwise.]

[61. A method according to claim 60, wherein said compressed-frame value and said recovery-frame value are identical.]

[62. A method according to claim 60, wherein said compressed-frame value and said recovery-frame value are different.]

[63. A method according to claim 62, wherein, in the case where a transmission gap does not overlap two frames, the recovery-frame value is inferior to the compressed-frame value.]

[64. A method according to claim 62, wherein, in the case where a transmission gap overlaps two frames, the recovery-frame value is superior to the compressed-frame value.]

[65. A method according to claim 60, wherein said recovery-frame value is not equal to zero.]

[66. A method according to claim 60, wherein said recovery-frame value is equal to zero.]

67. A method for setting a transmission quality target value (target *signal-to-interference ratio* SIR) for power control in a mobile radiocommunication system, wherein the transmission quality target value offset (ΔSIR) during compressed mode, compared to normal mode, includes a component intended to compensate for the effects of transmission gaps in compressed frames, [wherein] said component (ΔSIR_coding) [has] *comprising*:

in the case where a transmission gap does not overlap two frames:

a first value (DeltaSIR) for compressed frames, a second value (DeltaSIRafter) for recovery frames, following compressed frames, or a value zero otherwise, and in the case where a transmission gap overlaps two frames:

a first value (DeltaSIR) for compressed frames, with a first part of a transmission gap, a second value (DeltaSIRafter) for recovery frames, with a second part of a transmission gap, or a value zero otherwise.

[68. A method according to claim 67, wherein said first value and said second value are identical.]

[69. A method according to claim 67, wherein said first value and said second value are different.]

[70. A method according to claim 69, wherein, in the case where a transmission gap does not overlap two frames, said second value is inferior to said first value.]

[71. A method according to claim 69, wherein, in the case where a transmission gap overlaps two frames, said second value is superior to said first value.]

[72. A method according to claim 67, wherein said second value is not equal to zero.]

[73. A method according to claim 67, wherein said second value is equal to zero.]

[74. A method according to claim 67, wherein said transmission quality target value offset (ΔSIR) includes a component intended to compensate for the effects of a transmission rate adaptation to compensate for said transmission gaps.]

[75. A method according to claim 74, wherein said component intended to compensate for the effects of said transmission rate adaptation is defined by:

max (ΔSIR1_compression, . . . , ΔSIRn_compression), where "n" is the number of transmission time interval (TTI) lengths for all transport channels (TrChs) of a coded composite transport channel (CCTrCh), and ΔSIRi_compression has:

if compressed mode is performed by puncturing, a first value if there is a transmission gap within the current transmission time interval (TTI) for the $i^{th}$ transmission time interval length (with i=1, . . . n), or a value zero otherwise, if compressed mode is performed by reducing the spreading factor, a second value if the current frame is a compressed frame, or a value zero otherwise, and if compressed mode is performed by higher layer scheduling, a value zero.]

[76. A method according to claim 75, wherein said first value of ΔSIRi_compression is defined by:

ΔSIRi_compression=10 log ($N*F_i/(N*F_i-TGL_i)$) where $TGL_i$ is the gap length in number of slots in the current transmission time interval (TTI) of length $F_i$ frames, and N is the number of slots per frame.]

[77. A method according to claim 75, wherein said second value of ΔSIRi_compression is defined by:

ΔSIRi_compression=10log($R_{CF}$/R), where R is the instantaneous net bit rate during a normal frame and $R_{CF}$ is the instantaneous net bit rate during the current compressed frame.]

[78. A method according to claim 75, wherein said second value of ΔSIRi_compression is defined by:

ΔSIRi_compression=3 dB in the case of compressed mode by reducing the spreading factor by a factor of two.]

79. A mobile station comprising means for setting [a] *the* transmission quality target value (target SIR), *wherein the transmission quality target value offset* (Δ*SIR*) *during compressed mode, compared to normal mode, includes a component* (Δ*SIR_coding*) for downlink power control according to claim 67.

80. A mobile radiocommunication network entity comprising means for setting a transmission quality target value (target SIR), *wherein the transmission quality target value offset* (Δ*SIR*) *during compressed mode, compared to normal mode, includes a component* (Δ*SIR_coding*) for uplink power control according to claim 67.

81. A mobile radiocommunication network entity comprising means for [signalling] *signaling* to a mobile station said first *value* (*DeltaSIR*), and *means for signaling to said mobile station and* second [values] *value* ([Delta]*delta*SIR, D] (deltaSIRafter), for setting a transmission quality target value (target SIR) according to claim 67.

[82. A mobile radiocommunication system, comprising at least one mobile station according to claim 79.]

[83. A mobile radiocommunication system, comprising at least one mobile radiocommunication network entity according to claim 80 or 81.]

*84. A method for setting a target signal-to-interference power ratio SIR for power control in a mobile radiocommunication system, the method comprising:*

*for each frame, the target SIR offset during compressed mode, compared to normal mode is:*

$\Delta SIR = max(\Delta SIR1_compression, \ldots, \Delta SIRn_compression) + \Delta SIR_coding$

*where "n" is the number of TTI (Transmission Time Interval) lengths for all TrChs (Transport Channels) of a CCTrCh (Coded Composite Transport Channel), $F_i$ is the length in number of frames of the i-th TTI and where ΔSIR_coding fulfills:*

*ΔSIR_coding=DeltaSIR for compressed frames*

*ΔSIR_coding=DeltaSIRafter for frames following compressed frames*

*ΔSIR_coding=0 otherwise*

*and ΔSIRi_compression is defined by:*

*If the frames are compressed by puncturing:*

$\Delta SIRi_compression = 10\ log(N*F_i/(N*F_i - TGL_i))$ *if there is a transmission gap within the current TTI of length $F_i$ frames, where $TGL_i$ is the gap length in number of slots (either from one gap or a sum of gaps) in the current TTI of length $F_i$ frames, and N is the number of slots per frame,*

*ΔSIRi_compression=0 otherwise, and*

*said set target SIR is used for said power control.*

*85. A method according to claim 84, wherein:*

*If the frames are compressed by reducing the spreading factor:*

$\Delta SIRi_compression = 10\ log(R_{CF}/R)$ *for each compressed frame, where R is the instantaneous net bit rate before and after the compressed frame and $R_{CF}$ is the instantaneous net bit rate during the compressed frame,*

*ΔSIRi_compression=0 otherwise.*

*86. A method according to claim 84, wherein:*

*if the frames are compressed by higher layer scheduling:*

*ΔSIRi_compression=0.*

*87. A method according to claim 84, wherein:*

$\Delta SIRi_compression = 10\ log(15*F_i/(15*F_i - TGL_i))$ *if there is a transmission gap within the current TTI of length $F_i$ frames, where $TGL_i$ is the gap length in number of slots (either from one gap or a sum of gaps) in the current TTI of length $F_i$ frames.*

*88. A method according to claim 85, wherein*

*ΔSIRi_compression=3 dB in the case of compressed mode by reducing the spreading factor by a factor of two.*

*89. A method according to claim 84, wherein:*

*when a transmission gap overlaps two frames:*

*ΔSIR_coding=DeltaSIR for the first one of said two compressed frames, with a first part of said transmission gap,*

*ΔSIR_coding=DeltaSIRafter for the second one of said two compressed frames, with a second part of said transmission gap,*

*ΔSIR_coding=0 for the first frame following said two compressed frames.*

*90. A method according to claim 84, wherein:*

*in case several compressed mode patterns are used simultaneously, all target SIR offsets from all compressed mode patterns are added and the total target SIR offset is applied to the frame.*

*91. A mobile station, comprising means for setting a target signal-to-interference ratio SIR offset for power control, such that:*

*for each frame, the target SIR offset during compressed mode, compared to normal mode is:*

$\Delta SIR = max(\Delta SIR1_compression, \ldots, \Delta SIRn_compression) + \Delta SIR_coding$

*where "n" is the number of TTI (Transmission Time Interval) lengths for all TrChs (Transport Channels) of a CCTrCh (Coded Composite Transport Channel), $F_i$ is the length in number of frames of the i-th TTI and where ΔSIR_coding fulfills:*

*ΔSIR_coding=DeltaSIR for compressed frames*

*ΔSIR_coding=DeltaSIRafter for frames following compressed frames*

*ΔSIR_coding=0 otherwise*

*and ΔSIRi_compression is defined by:*

*If the frames are compressed by puncturing:*

$\Delta SIRi_compression = 10\ log(N*F_i/(N*F_i - TGL_i))$ *if there is a transmission gap within the current TTI of length $F_i$ frames, where $TGL_i$ is the gap length in number of slots (either from one gap or a sum of gaps) in the current TTI of length $F_i$ frames, and N is the number of slots per frame,*

*ΔSIRi_compression=0 otherwise; and*

*means for using said target SIR offset for said power control.*

*92. A mobile station according to claim 91, comprising means for setting a target SIR offset for power control, such that:*

*If the frames are compressed by reducing the spreading factor:*

$\Delta SIRi_compression = 10\ log(R_{CF}/R)$ *for each compressed frame, where R is the instantaneous net bit rate before and after the compressed frame and $R_{CF}$ is the instantaneous net bit rate during the compressed frame,*

*ΔSIRi_compression=0 otherwise.*

*93. A mobile station according to claim 91, comprising means for setting a target SIR offset for power control, such that:*

*if the frames are compressed by higher layer scheduling:*

*ΔSIRi_compression=0.*

*94. A mobile station according to claim 91, comprising means for setting a target SIR offset for power control, such that:*

$\Delta SIRi_compression = 10\ log(15*F_i/(15*F_i - TGL_i))$ *if there is a transmission gap within the current TTI of length $F_i$ frames, where $TGL_i$ is the gap length in number of slots (either from one gap or a sum of gaps) in the current TTI of length $F_i$ frames.*

*95. A mobile station according to claim 92, comprising means for setting a target SIR offset for power control, such that:*

*ΔSIRi_compression=3 dB in the case of compressed mode by reducing the spreading factor by a factor of two.*

*96. A mobile station according to claim 91, comprising means for setting a target SIR offset for power control, such that:*

*when a transmission gap overlaps two frames:*

*ΔSIR_coding=DeltaSIR for the first one of said two compressed frames, with a first part of said transmission gap,*

*ΔSIR_coding=DeltaSIRafter for the second one of said two compressed frames, with a second part of said transmission gap,*

*ΔSIR_coding=0 for the first frame following said two compressed frames.*

*97. A mobile station according to claim 91, comprising means for setting a target SIR offset for power control, such that:*

*in case several compressed mode patterns are used simultaneously, all target SIR offsets from all compressed mode patterns are added and the total target SIR offset is applied to the frame.*

*98. A mobile radiocommunication network entity, comprising means for signaling to a mobile station the value DeltaSIR of a target signal-to-interference ratio SIR offset to be applied by said mobile station to a target SIR for power control, and means for signaling to a mobile station the value DeltaSIRafter of said target signal-to-interference ratio SIR offset, such that:*

*for each frame, the target SIR offset during compressed mode, compared to normal mode is:*

*ΔSIR=max(ΔSIR1_compression, . . . , ΔSIRn_compression)+ΔSIR_coding*

*where "n" is the number of TTI (Transmission Time Interval) lengths for all TrChs (Transport Channels) of a CCTrCh (Coded Composite Transport Channel), $F_i$ is the length in number of frames of the i-th TTI and where ΔSIR_coding fulfills:*

*ΔSIR_coding=DeltaSIR for compressed frames*

*ΔSIR_coding=DeltaSIRafter for frames following compressed frames*

*ΔSIR_coding=0 otherwise*

*and ΔSIRi_compression is defined by:*

*If the frames are compressed by puncturing:*

*ΔSIRi_compression=10 log(N*$F_i$/(N*$F_i$−$TGL_i$)) if there is a transmission gap within the current TTI of length $F_i$ frames, where $TGL_i$ is the gap length in number of slots (either from one gap or a sum of gaps) in the current TTI of length $F_i$ frames, and N is the number of slots per frame,*

*ΔSIRi_compression=0 otherwise.*

*99. A mobile radiocommunication network entity according to claim 98, comprising means for signaling to a mobile station the values DeltaSIR and DeltaSIRafter of a target SIR offset to be applied by said mobile station to a target SIR for power control, such that:*

*If the frames are compressed by reducing the spreading factor:*

*ΔSIRi_compression=10 log($R_{CF}$/R) for each compressed frame, where R is the instantaneous net bit rate before and after the compressed frame and $R_{CF}$ is the instantaneous net bit rate during the compressed frame,*

*ΔSIRi_compression=0 otherwise.*

*100. A mobile radiocommunication network entity according to claim 98, comprising means for signaling to a mobile station the values DeltaSIR and DeltaSIRafter of a target SIR offset to be applied by said mobile station to a target SIR for power control, such that:*

*if the frames are compressed by higher layer scheduling:*

*ΔSIRi_compression=0.*

*101. A mobile radiocommunication network entity according to claim 98, comprising means for signaling to a mobile station the values DeltaSIR and DeltaSIRafter of a target SIR offset to be applied by said mobile station to a target SIR for power control, such that:*

*ΔSIRi_compression=10 log(15*$F_i$/(15*$F_i$−$TGL_i$)) if there is a transmission gap within the current TTI of length $F_i$ frames, where $TGL_i$ is the gap length in number of slots (either from one gap or a sum of gaps) in the current TTI of length $F_i$ frames.*

*102. A mobile radiocommunication network entity according to claim 99, comprising means for signaling to a mobile station the values DeltaSIR and DeltaSIRafter of a target SIR offset to be applied by said mobile station to a target SIR for power control, such that:*

*ΔSIRi_compression=3 dB in the case of compressed mode by reducing the spreading factor by a factor of two.*

*103. A mobile radiocommunication network entity according to claim 98, comprising means for signaling to a mobile station the values DeltaSIR and DeltaSIRafter of a target SIR offset to be applied by said mobile station to a target SIR for power control, such that:*

*when a transmission gap overlaps two frames:*

*ΔSIR_coding=DeltaSIR for the first one of said two compressed frames, with a first part of said transmission gap,*

*ΔSIR_coding=DeltaSIRafter for the second one of said two compressed frames, with a second part of said transmission gap,*

*ΔSIR_coding=0 for the first frame following said two compressed frames.*

*104. A mobile radiocommunication network entity according to claim 98, comprising means for signaling to a mobile station the values DeltaSIR and DeltaSIRafter of a target SIR offset to be applied by said mobile station to a target SIR for power control, such that:*

*in case several compressed mode patterns are used simultaneously, all target SIR offsets from all compressed mode patterns are added and the total target SIR offset is applied to the frame.*

*105. A method according to claim 67, wherein said first value and said second value are identical.*

*106. A method according to claim 67, wherein said first value and said second value are different.*

*107. A method according to claim 106, wherein, in the case where a transmission gap does not overlap two frames, said second value is inferior to said first value.*

*108. A method according to claim 106, wherein, in the case where a transmission gap overlaps two frames, said second value is superior to said first value.*

*109. A method according to claim 67, wherein said second value is not equal to zero.*

*110. A method according to claim 67, wherein said second value is equal to zero.*

*111. A method according to claim 67, wherein said transmission quality target value offset (ΔSIR) includes a component intended to compensate for the effects of a transmission rate adaptation to compensate for said transmission gaps.*

*112. A method according to claim 111, wherein said component intended to compensate for the effects of said transmission rate adaptation is defined by:*

*max(ΔSIR1_compression, . . . , ΔSIRn_compression), where "n" is the number of transmission time interval (TTI) lengths for all transport channels (TrChs) of a coded composite transport channel (CCTrCh), and ΔSIRi_compression has:*

*if compressed mode is performed by puncturing, a first value if there is a transmission gap within the current transmission time interval (TTI) for the $i^{th}$ transmission time interval length (with i=1, . . . n), or a value zero otherwise,*

*if compressed mode is performed by reducing the spreading factor, a second value if the current frame is a compressed frame, or a value zero otherwise, and*

*if compressed mode is performed by higher layer scheduling, a value zero.*

*113. A method according to claim 112, wherein said first value of ΔSIRi_compression is defined by:*

$\Delta SIRi_compression=10\ \log(N*F_i/(N*F_i-TGL_i))$ *where $TGL_i$ is the gap length in number of slots in the current transmission time interval (TTI) of length $F_i$ frames, and N is the number of slots per frame.*

*114. A method according to claim 112, wherein said second value of ΔSIRi_compression is defined by:*

$\Delta SIRi_compression=10\ \log(R_{CF}/R)$, *where R is the instantaneous net bit rate during a normal frame and $R_{CF}$ is the instantaneous net bit rate during the current compressed frame.*

*115. A method according to claim 112, wherein said second value of ΔSIRi_compression is defined by:*

*ΔSIRi_compression=3 dB in the case of compressed mode by reducing the spreading factor by a factor of two.*

* * * * *